United States Patent
Maercovich

(10) Patent No.: US 10,077,848 B2
(45) Date of Patent: Sep. 18, 2018

(54) MOTORIZED FLUID FLOW CONTROL VALVE

(71) Applicant: Jorge Maercovich, Chatsworth, CA (US)

(72) Inventor: Jorge Maercovich, Chatsworth, CA (US)

(\*) Notice: Subject to any disclaimer, the term of this patent is extended or adjusted under 35 U.S.C. 154(b) by 0 days.

(21) Appl. No.: 14/582,198

(22) Filed: Dec. 24, 2014

(65) Prior Publication Data

US 2016/0186867 A1  Jun. 30, 2016

(51) Int. Cl.
*E03C 1/23* (2006.01)
*F16K 31/04* (2006.01)
*F16K 3/08* (2006.01)
*F16K 11/078* (2006.01)

(52) U.S. Cl.
CPC .............. *F16K 31/041* (2013.01); *F16K 3/08* (2013.01); *E03C 1/23* (2013.01); *F16K 11/078* (2013.01)

(58) Field of Classification Search
CPC ........... E03C 1/2302; E03C 2001/2311; F16K 11/00; F16K 11/0782; F16K 19/006; F16K 3/08; F16K 3/085; F16K 31/041; F16K 31/042
USPC .................. 137/602, 603, 605, 607
See application file for complete search history.

(56) References Cited

U.S. PATENT DOCUMENTS

| | | | | |
|---|---|---|---|---|
| 3,862,739 A * | 1/1975 | Fujiwara | ............... | F16K 31/041 251/129.03 |
| 8,028,355 B2 * | 10/2011 | Reeder | ..................... | A46B 7/04 4/623 |
| 8,162,236 B2 * | 4/2012 | Rodenbeck | ............. | E03C 1/057 239/390 |
| 2008/0060706 A1 * | 3/2008 | Combs | ................... | A62C 35/68 137/556 |
| 2010/0163773 A1 * | 7/2010 | Ferrero | ................. | F16K 31/041 251/291 |
| 2011/0226001 A1 * | 9/2011 | Kannoo | ................. | F16K 11/074 62/324.6 |
| 2013/0042934 A1 * | 2/2013 | Endt | ..................... | G01F 15/005 137/560 |
| 2014/0261749 A1 * | 9/2014 | Chen | ....................... | E03C 1/057 137/78.1 |
| 2015/0159351 A1 * | 6/2015 | Smith | ..................... | E03C 1/025 251/129.11 |

\* cited by examiner

*Primary Examiner* — Seth W Mackay-Smith
(74) *Attorney, Agent, or Firm* — Raymond Y. Chan; David and Raymond Patent Firm

(57) ABSTRACT

A fluid flow control valve includes a valve body and a motorized unit. The valve body is supported in a fluid system between a fluid inlet and a fluid outlet, and is moved between an opened condition for enabling a flow of fluid to flow from the fluid inlet to the fluid outlet and a closed condition for blocking the fluid to flow to the fluid outlet. The motorized unit includes an electric motor and an actuator which is operatively linked to the electric motor and is coupled with the valve body, wherein when the electric motor is activated, the actuator is driven to rotate to actuate the valve body between the opened condition and the closed condition.

6 Claims, 5 Drawing Sheets

MOTORIZED FLUID FLOW CONTROL VALVE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a valve, and more particular to a motorized fluid control valve, which is powered by a motorized unit to selectively actuate the valve body between an opened condition and a closed condition.

Description of Related Arts

A regulator is a device for regulating and controlling a flow of fluid, wherein the regulator generally comprises a valve supported in a passageway, and a handle actuator being actuated to selectively close the valve to stop the fluid to pass through the passageway open the valve to allow the fluid to pass through the passageway. For example, a faucet valve, such as a ceramic disc faucet valve, is installed into a faucet device, wherein the valve comprises a plurality of discs moving against each other. When the handle actuator is manually actuated to move the discs away from each other, the valve is opened for allowing the water to pass through the passageway. Likewise, when the discs are moved toward each other by the handle actuator, the passageway is sealed to block the water to pass through. Another example of the valve is a flush valve, such as a relief valve, installed into a urinal system, wherein the handle actuator, i.e. the flush lever, is manually actuated to move a diaphragm for completing the flushing operation. The common problem of these valves is that the valves must be operated manually.

For hygiene purposes, an automatic operated valve is developed, wherein the automatic operated valve is operated by a solenoid as a replacement of the handle actuator. It is known that the solenoid is made of a number of circular wire loops to generate a magnetic force when an electric current is passed through the wire loops. When the flush valve incorporates the solenoid, the solenoid may come in contact with water, such that the solenoid may accumulate rusting particles from the water, which may remain on the solenoid. It is one of the common problems to cause a failure of operation of the flush valve. In other words, the conventional manual operated flush valve is more reliable than the solenoid operated automatic flush valve. Thus, the maintenance cost of the solenoid operated automatic flush valve is higher than that of the conventional manual operated flush valve.

The configuration of the solenoid operated automatic flush valve is complicated, wherein once the solenoid is broken or the battery is dead, the facility should call a technician to open an outer cover and disassemble an inner cover for the replacement of the solenoid or the battery. Due to the complicated structure of the solenoid operated automatic flush valve, the solenoid operated automatic flush valve requires a skilled technician to replace the broken solenoid and/or even replace the battery, which may further increase the maintenance cost of the infrared operated automatic flush valve.

Furthermore, solenoid does not provide enough power to actuate the valve. Accordingly, for high pressure fluid regulator, the valve must be strong enough to withstand the pressure of the fluid. However, the solenoid cannot generate a powerful actuation force, i.e. the torque, to actuate the valve. Therefore, the solenoid cannot incorporate with different types of valves.

More importantly, the solenoid cannot control the volume of fluid. Accordingly, the solenoid can only actuate the valve either at the opened condition or at the closed condition. Therefore, there exists a great need for controlling volume of fluid to meet the different requirements and situations of using the valve.

SUMMARY OF THE PRESENT INVENTION

The invention is advantageous in that it provides a motorized fluid control valve, which is powered by a motorized unit to selectively actuate the valve body between an opened condition and a closed condition.

Another advantage of the invention is to a motorized fluid control valve, which can incorporate with different types of fluid systems.

Another advantage of the invention is to a motorized fluid control valve, which generates power torque as the actuation force, such that the motorized fluid control valve is able to control any high pressure fluid system.

Another advantage of the invention is to a motorized fluid control valve, which can control the volume of fluid, such that the valve body can be moved between the opened condition and the closed condition to selectively adjust the volume of fluid.

Another advantage of the invention is to a motorized fluid control valve, which can be remotely controlled by any remote controller.

Another advantage of the invention is to a motorized fluid control valve, which does not require altering the original structural design of the fluid system in order to incorporate with the present invention.

Another advantage of the invention is to a motorized fluid control valve, which is reliable and that can be easily installed and maintained.

Another advantage of the invention is to a motorized fluid control valve, wherein the motorized unit comprises an electric motor to avoid water damage and to enhance performance and reliability.

Another advantage of the invention is to a motorized fluid control valve, which provides an economic and efficient solution for incorporating with the conventional fluid system in a simple and economical way.

Additional advantages and features of the invention will become apparent from the description which follows, and may be realized by means of the instrumentalities and combinations particular point out in the appended claims.

According to the present invention, the foregoing and other objects and advantages are attained by a fluid flow control valve for a fluid system having a fluid inlet and a fluid outlet, comprising a valve body and a motorized unit.

The valve body is supported in the fluid system between the fluid inlet and the fluid outlet, and is moved between an opened condition for enabling a flow of fluid to flow from the fluid inlet to the fluid outlet and a closed condition for blocking the fluid to flow to the fluid outlet.

The motorized unit comprises an electric motor and an actuator which is operatively linked to the electric motor and is coupled with the valve body, wherein when the electric motor is activated, the actuator is driven to rotate to actuate the valve body between the opened condition and the closed condition In accordance with another aspect of the invention, the present invention comprises a method of controlling a flow of fluid from a fluid inlet of a fluid system to a fluid outlet thereof, comprising the following steps.

(A) Support a valve body in the fluid system between the fluid inlet and the fluid outlet, wherein the valve body is moved between an opened condition and a closed condition.

(B) Couple an actuator with the valve body.

(C) Drive the actuator to rotate by an electric motor to actuate the valve body between the opened condition and the closed condition.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
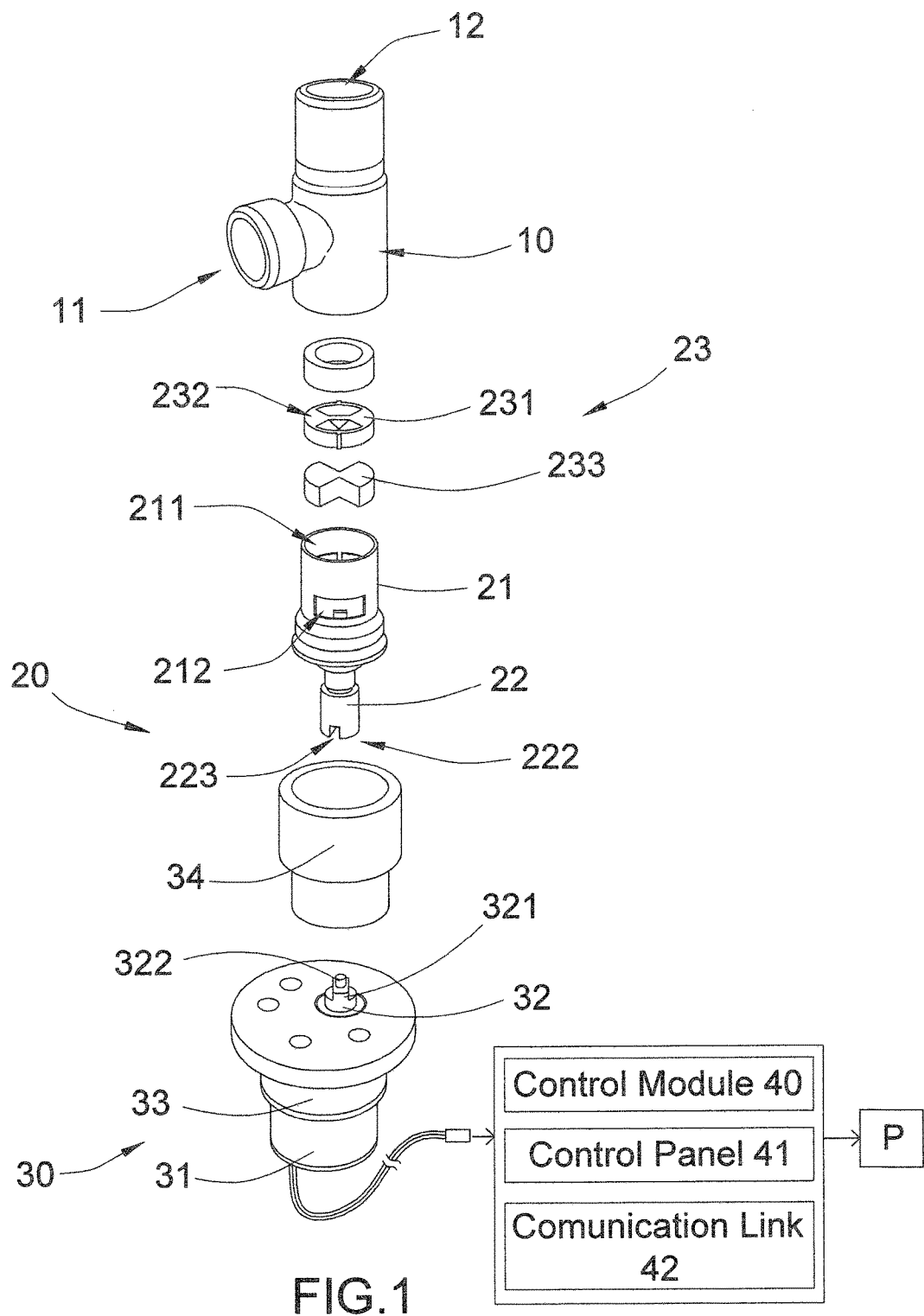
FIG. 1 is an exploded perspective view of a fluid flow control valve for a fluid system according to a preferred embodiment of the present invention.

Referring to FIG. 1 of the drawings, a fluid flow control valve for a fluid system according to a preferred embodiment of the present invention is illustrated, wherein the fluid system can be a water faucet system, a gas delivering system, or an air distributing system. Accordingly, the fluid system comprises a T-shaped piping member 10 having a fluid inlet 11, a fluid outlet 12, and a fluid chamber 13 between the fluid inlet 11 and the fluid outlet 12, wherein the piping member 10 is arranged to guide a flow of fluid, such as water, gas or air, to pass from the fluid inlet 11 to the fluid outlet 12 through the fluid chamber 13.

The fluid flow control valve of the present invention comprises a valve body 20 supported in the fluid system. In particular, the valve body 20 is supported at the fluid chamber 13, wherein the valve body 20 is moved between an opened condition for enabling the fluid to flow from the fluid inlet 11 to the fluid outlet 12, and a closed condition for blocking the fluid to flow from the fluid inlet 11 to the fluid outlet 12.

The fluid flow control valve further comprises a motorized unit 30 which comprises an electric motor 31 and an actuator 32 which is operatively linked to the electric motor 31 and is coupled with the valve body 20, wherein when the electric motor 31 is activated, the actuator 32 is driven to rotate to actuate the valve body 20 between the opened condition and the closed condition.

Figure 2:
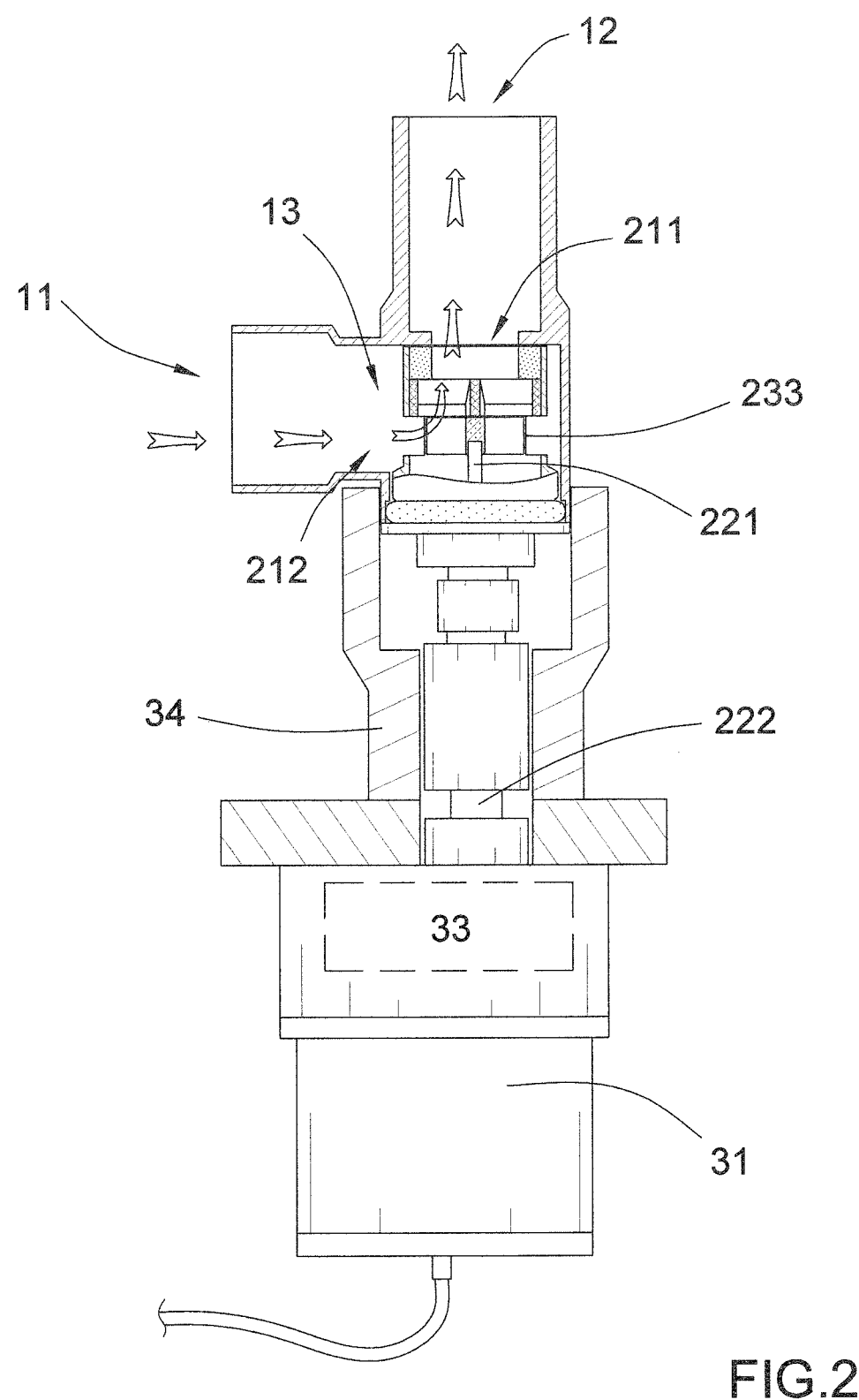
FIG. 2 is a sectional view of the fluid flow control valve for the fluid system according to the above preferred embodiment of the present invention, illustrating a closed condition of the valve body.
Figure 3:
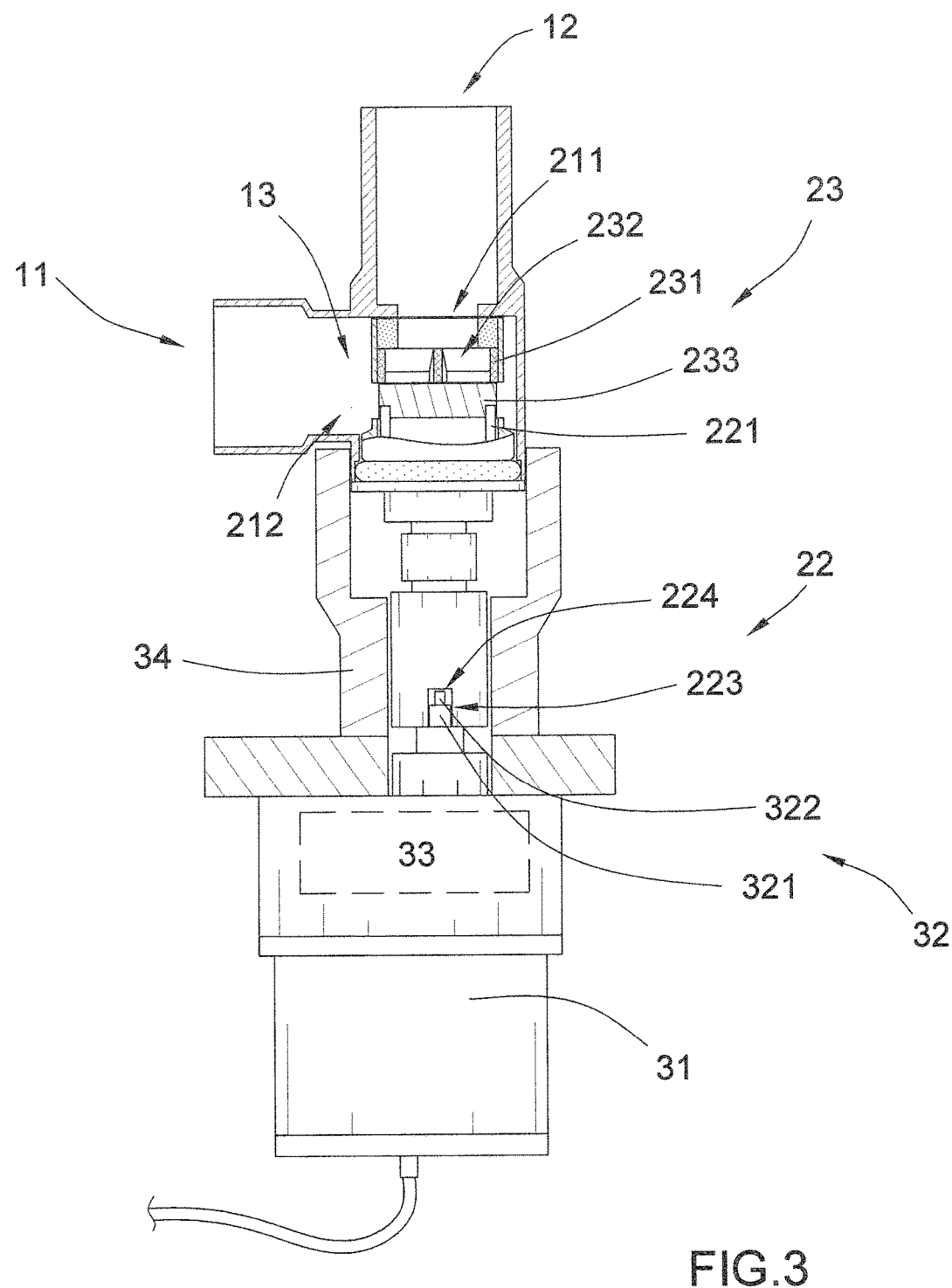
FIG. 3 is a sectional view of the fluid flow control valve for the fluid system according to the above preferred embodiment of the present invention, illustrating an opened condition of the valve body.

As shown in FIGS. 1 to 3, the valve body 20 comprises a tubular controlling housing 21 supported in the fluid chamber 13 and a valve controlling arm 22 rotatably supported at the controlling housing 21. Accordingly, the controlling housing 21 has a housing opening 211 coaxially aligned with the fluid outlet 12 and a housing entrance 212 formed at a surrounding wall of the controlling housing 21 to align with the fluid inlet 11. Therefore, the fluid is guided to flow into the controlling housing 21 from the housing entrance 212 and to flow out of the controlling housing 21 at the housing opening 211.

The valve controlling arm 22 has a sealing end 221 extended to the housing opening 211 and a free end 222 extended out of the controlling housing 21, wherein the free end 22 of the valve controlling arm 22 is coupled to the actuator 32 so as to drive the valve controlling arm 22 to rotate at the controlling housing 21. Accordingly, when the free end 222 of the valve controlling arm 22 is actuated to be rotated, the sealing end 221 of the valve controlling arm 22 to seal at the fluid outlet 12 of the valve body 20, so as to block the fluid to flow from the fluid inlet 11 to the fluid outlet 12. It is worth mentioning that when the valve controlling arm 22 is rotated within the controlling housing 21 at the closed condition, the housing entrance 212 of the controlling housing 21 is closed by the valve controlling arm 22. Therefore, the valve body 10 is closed by sealing the housing opening 211 by the sealing end 221 of the valve controlling arm 22 and by sealing the housing entrance 212 by the valve controlling arm 22.

As shown in FIGS. 1 to 3, the free end 222 of the valve controlling arm 22 is engaged with the free end of the actuator 32. In particular, the valve controlling arm 22 further has an engaging slot 223 formed at the free end 222 thereof, wherein the engaging slot 223 is an elongated slot indent at the free end 22 of the valve controlling arm 22. The actuator 32 has an engaging latch 321 integrally protruded from at the free end thereof to engage with the engaging slot 223 so as to drive the valve controlling arm 22 to rotate. Accordingly, when the engaging latch 321 is engaged with the engaging slot 223, the free end of the actuator 32 is engaged with the free end 222 of the valve controlling arm 22 end-to-end. Therefore, when the actuator 32 is rotated, the valve controlling arm 22 is driven to rotate.

In order to prevent any misalignment between the engaging latch 321 is engaged with the engaging slot 223, the valve controlling arm 22 further has an alignment hole 224 formed within the engaging slot 223, wherein the alignment hole 224 is indented at a bottom wall of the engaging slot 223. The actuator 32 further has an alignment member 322 integrally protruded from the engaging latch 321, wherein the alignment member 322 is engaged with the alignment hole 224 when the engaging latch 321 is engaged with the engaging slot 223, so as to ensure an engagement between the engaging latch 321 and the engaging slot 223.

Figure 4:
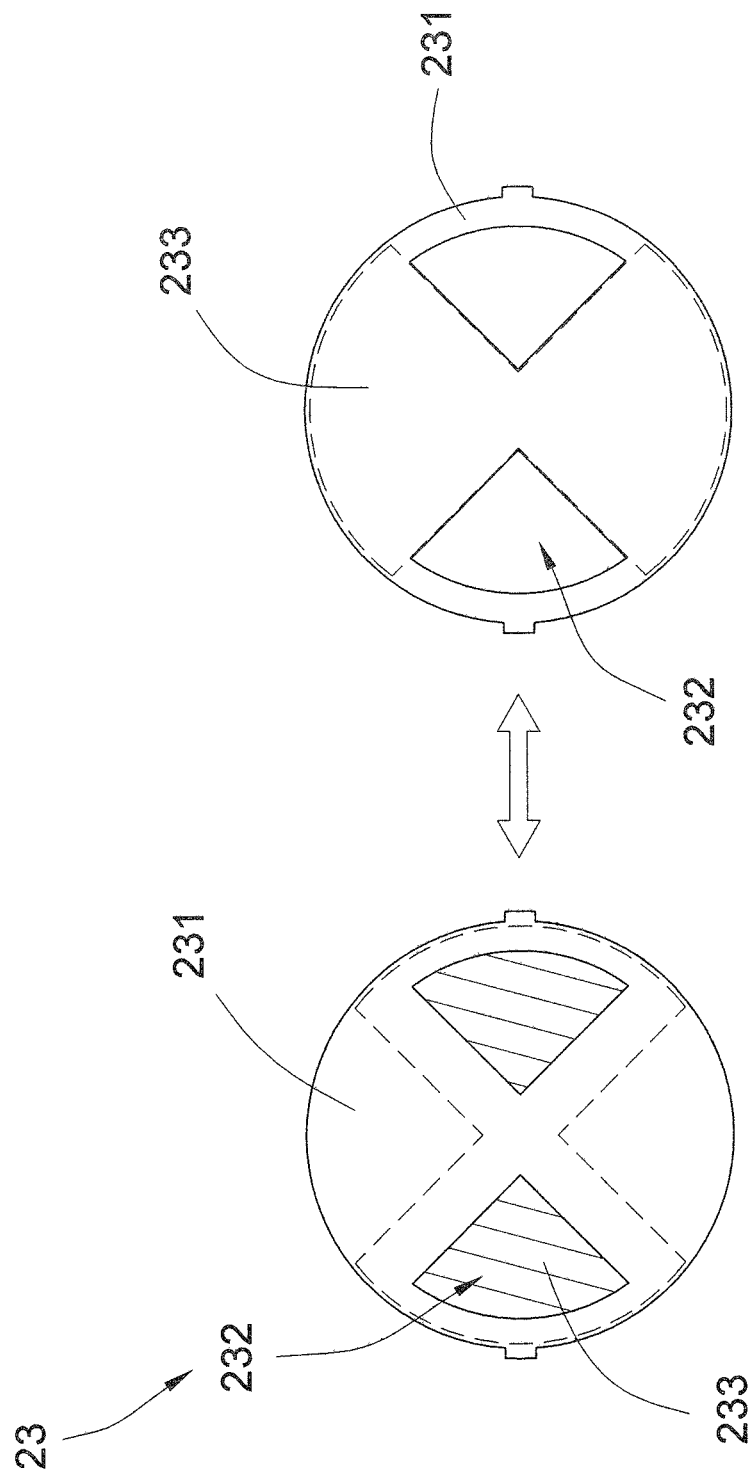
FIG. 4 is a top view of the valve body of the fluid flow control valve for the fluid system according to the above preferred embodiment of the present invention, illustrating the valve body being moved between the closed condition and the opened condition.

As shown in FIG. 4, the valve body 20 further comprises a valve actuating unit 23 supported within the controlling housing 21, wherein the valve actuating unit 23 comprises a stationary valve 231 having at least an opening slot 232 communicating with the housing opening 211, and a movable valve 233 rotatably supported below the stationary valve 231. Accordingly, the sealing end 221 of the valve controlling arm 22 is extended to couple with the movable valve 233, such that when the valve controlling arm 22 is rotated at one direction, the movable valve 233 is rotated to close the opening slot 232 for blocking the air to flow to the fluid outlet 12. Likewise, when the valve controlling arm 22 is rotated at the opposite direction, the movable valve 233 is rotated to open the opening slot 232 for allowing the air to flow to the fluid outlet 12.

Accordingly, the electric motor 31 is electrically connected to a power source P to generate a rotational power. In particular, the electric motor 31 is arranged to generate the reversible rotation power. When the electric motor 31 generates the rotational power at a clockwise direction, the valve body 20 is moved from the closed condition to the opened condition. When the electric motor 31 generates the rotational power at a counter-clockwise (reversed) direction, the valve body 20 is moved from the closed condition to the opened condition. It is worth to mention that the electric motor 31 is more reliable than the solenoid because the electric motor 31 provides simple mechanical work rather than using the magnetic force, so as to minimize the failure operation of the motorized unit 30 and to reduce the maintenance cost of the present invention.

As shown in FIGS. 1 to 3, the motorized unit 30 further comprises a gear unit 33 operatively linked between an output end of the electric motor 31 and the actuator 32 for adjustably controlling a rotational speed of the actuator 32. The gear unit 33 comprises a set of gears engaging with each other to transmit the rotational power from the electric motor 31 to the actuator 32. In particular, the gear unit 33 is arranged to selectively adjust the torque from the electric motor 31 to the actuator 32 in order to adjustably control the rotation speed of the actuator 32. For example, when the rotational output of the electric motor 31 is 1000 rpm, the gear unit 33 will adjust to the actuator 32 at 10 rpm. Therefore, the rotational speed and torque can be selectively adjusted at the actuator 32 in order to generate enough power to actuate the valve controlling arm 22 of the valve body 20.

As shown in FIGS. 1 to 3, the motorized unit 30 further comprises a tubular retention housing 34 extended between the electric motor 31 and the controlling housing 21. In particular, one end of the retention housing 34 is affixed to the gear unit 33 which is coupled to the electric motor 31, while another end of the retention housing 34 is detachably coupled to the controlling housing 21. Accordingly, the free end 222 of the valve controlling arm 22 is engaged with the free end of the actuator 32 within the retention housing 34, so as to protect the engagement between the valve controlling arm 22 and the actuator 32.

According to the preferred embodiment, the fluid flow control valve further comprises a control module 40 operatively linked to the motorized unit 30 to control an operation of the motorized unit 30. Accordingly, the control module 40 comprises a control panel 41 operatively linked to the electric motor 31 for controlling an activation of the electric motor 31 and an angular movement of the actuator 32. In other words, the angular movement of the actuator 32 will be adjusted to control a volume of the fluid to pass from the fluid inlet 11 to the fluid outlet 12. For example, when the angular movement of the actuator 32 is moved at the opened condition, maximum volume of the fluid will pass from the fluid inlet 11 to the fluid outlet 12. When the angular movement of the actuator 32 is moved between the opened condition and the closed condition, a predetermined volume of the fluid will pass from the fluid inlet 11 to the fluid outlet 12. Preferably, the control panel 41 comprises a circuit panel to control the activation of the electric motor 31 and an angular movement of the actuator 32.

In order to control the control panel 41, the control module 40 further comprises a communication link 42 operatively linked to the control panel 41. Depending on the usage of the fluid flow control valve, the communication link 42 can be configured as a remote control and/or sensor control. As shown in FIG. 1, the fluid flow control valve incorporating with a gas delivering system as the fluid system, wherein the fluid inlet 11 and the fluid outlet 12 are the gas inlet and the gas outlet of the gas delivering system respectively. The communication link 42 comprises a remote controller wirelessly linked to the control panel 41. Therefore the user is able to remotely control the activation of the motorized unit 30 to move the valve body 20 between the closed condition and the opened condition. In particular, the communication link 42 will also control the angular movement of the actuator 32 to adjust the volume of gas to pass from the fluid inlet 11 to the fluid outlet 12.

Figure 5:
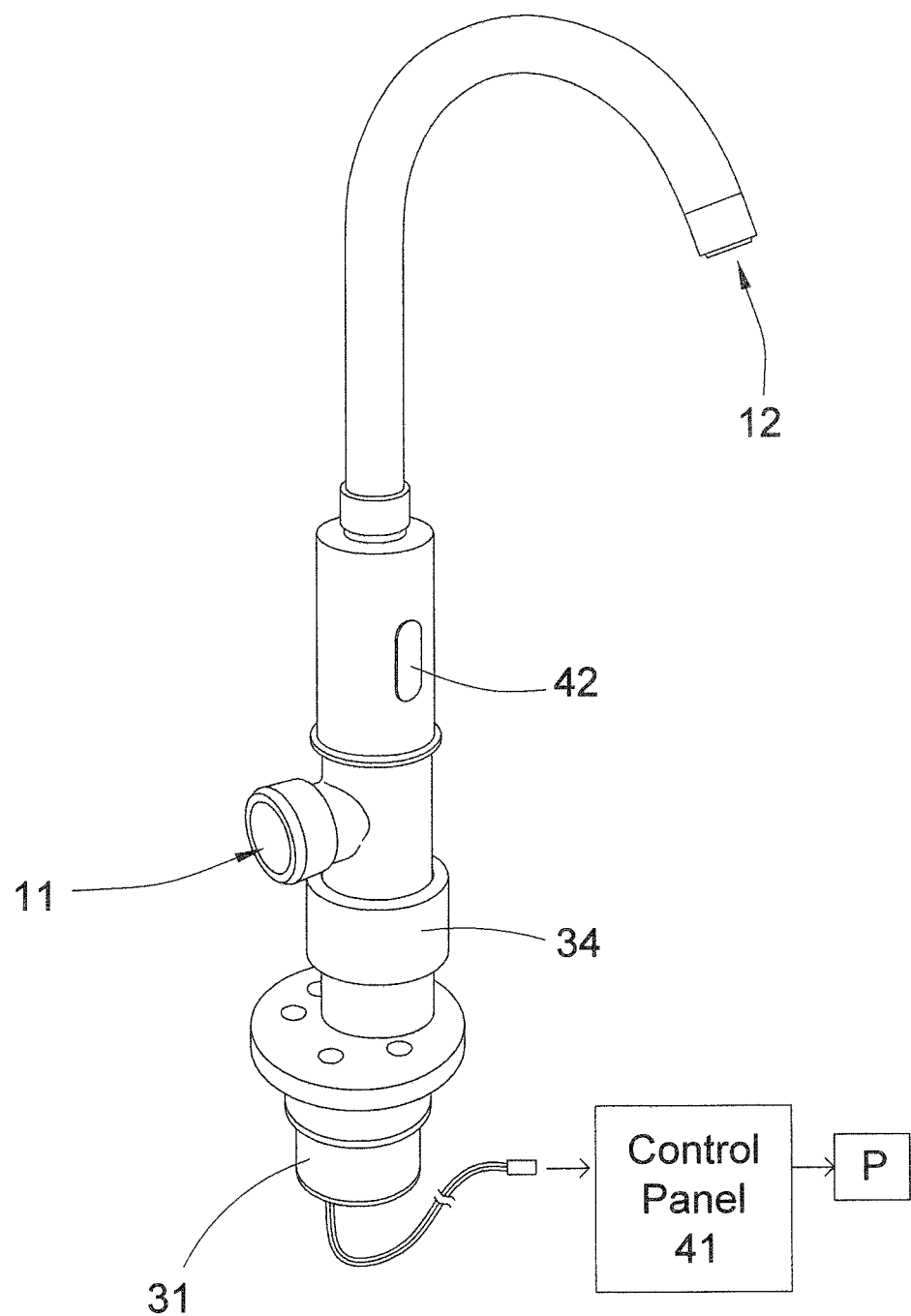
FIG. 5 illustrates the fluid flow control valve incorporating with a faucet system as the fluid system according to the above preferred embodiment of the present invention.

FIG. 5 illustrates the fluid flow control valve incorporating with a faucet system as the fluid system. The faucet system comprises a water passage defining the piping member 10 thereat, wherein the fluid inlet 11 and the fluid outlet 12 are the water inlet and the water outlet of the faucet system respectively. In particular, the communication link 42 comprises an infrared sensor linked to the control panel 41 for detecting the presence of a user of the faucet system. When the infrared sensor detects the presence of the user of the faucet system, the infrared sensor sends an infrared signal to the control panel 41, such that the electric motor 31 is activated to generate the rotational power to drive the actuator 32. As a result, the valve controlling arm 22 is driven to rotate from the closed condition to the opened condition so as to allow the water to flow from the fluid inlet 11 to the fluid outlet 12. Once the user is out of the detecting range of the infrared sensor, the infrared sensor sends a second infrared signal to the control panel 41, such that the electric motor 31 is re-activated to drive the actuator 32 to rotate at the opposite direction so as to drive the valve controlling arm 22 back to the closed condition from the opened condition.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A fluid flow control valve for a fluid system having a fluid inlet, a fluid outlet, and a fluid chamber, comprising:

a valve body for being supported in said fluid system between said fluid inlet and said fluid outlet, wherein said valve body comprises a controlling housing supported in said fluid chamber, a valve controlling arm rotatably supported at said controlling housing and a valve actuating unit supported within said controlling housing, wherein said valve actuating unit comprises a stationary valve having at least an opening slot, and a movable valve rotatably supported below said stationary valve, wherein said controlling housing has a housing opening coaxially aligned with said fluid outlet and communicated with said opening slot of said stationary valve, and a housing entrance formed at a surrounding wall of said controlling housing to align with said fluid inlet; and a motorized unit which comprises an electric motor and an actuator which is operatively linked to said electric motor and is coupled with said valve controlling arm of said valve body, wherein when said electric motor is activated to rotate said valve controlling arm to an opened condition, said movable valve is rotated to open said opening slot, so as to communicate said housing entrance with said opening slot to allow a flow of fluid to flow from said fluid inlet to said fluid outlet, and when said electric motor is activated to rotate said valve controlling arm at a closed condition, said housing entrance of said controlling housing is closed by said valve controlling arm; and wherein said valve controlling arm has a sealing end extended to said housing opening and a free end extended out of said controlling housing, wherein said free end of said valve controlling arm is coupled to said actuator, wherein when said valve controlling arm is rotated within said controlling housing at said closed condition and said housing entrance of said controlling housing is closed by said valve controlling arm, said housing opening is sealed by said sealing end.

2. The fluid flow control valve, as recited in claim 1, wherein said motorized unit further comprises a gear unit operatively linked between an output end of said electric motor and said actuator for adjustably controlling a rotational speed of said actuator.

3. The fluid flow control valve, as recited in claim 1, wherein said valve controlling arm has an engaging slot formed at said free end thereof, and said actuator has an engaging latch integrally protruded to engage with said engaging slot so as to drive said valve controlling arm to rotate, wherein said valve controlling aim further has an alignment hole formed within said engaging slot, wherein said actuator further has an alignment member integrally protruded from said engaging latch to engage with said alignment hole to ensure an engagement between said engaging latch and said engaging slot.

4. The fluid flow control valve, as recited in claim 3, wherein said motorized unit further comprises a tubular retention housing extended between said electric motor and said controlling housing at a position that said free end of said valve controlling arm is engaged with said actuator within said retention housing, wherein said retention housing is detachably coupled with said controlling housing.

5. The fluid flow control valve, as recited in claim 4, further comprising a control module operatively linked to said electric motor for controlling an activation of said electric motor and an angular movement of said actuator so as to control a predetermined volume of said fluid to pass from said fluid inlet to said fluid outlet.

6. The fluid flow control valve, as recited in claim 1, further comprising a control module operatively linked to said electric motor for controlling an activation of said electric motor and an angular movement of said actuator so as to control a predetermined volume of said fluid to pass from said fluid inlet to said fluid outlet.

* * * * *